(12) United States Patent
Milton (10) Patent No.: US 9,393,979 B1
(45) Date of Patent: Jul. 19, 2016

(54) MULTIPURPOSE MOBILE CADDY

(71) Applicant: Deneen Milton, Lansing, IA (US)

(72) Inventor: Deneen Milton, Lansing, IA (US)

( * ) Notice: Subject to any disclaimer, the term of this patent is extended or adjusted under 35 U.S.C. 154(b) by 0 days.

(21) Appl. No.: 14/739,742

(22) Filed: Jun. 15, 2015

Related U.S. Application Data (60) Provisional application No. 62/013,845, filed on Jun. 18, 2014.

(51) Int. Cl.
*B25H 1/04* (2006.01)
*B62B 3/02* (2006.01)

(52) U.S. Cl.
CPC ........................................ *B62B 3/02* (2013.01)

(58) Field of Classification Search
CPC ................................... B62B 3/02; B62B 5/02
USPC ..................................................... 280/47.35
See application file for complete search history.

(56) References Cited

U.S. PATENT DOCUMENTS

| | | | | |
|---|---|---|---|---|
| 2,887,705 A * | 5/1959 | Serwer | ............ | B44D 3/126 15/257.06 |
| 3,682,109 A * | 8/1972 | Gordon | ............ | A47B 13/081 108/9 |
| 4,941,229 A * | 7/1990 | La Pierre | ............ | B44D 3/126 15/257.06 |
| 4,993,726 A * | 2/1991 | Schumacher | ............ | B44D 3/14 108/125 |
| 5,082,301 A * | 1/1992 | Schumacher | ............ | B44D 3/14 15/257.06 |
| 5,190,303 A * | 3/1993 | Schumacher | ............ | B44D 3/14 108/129 |
| 5,341,969 A * | 8/1994 | Accardo | ............ | B44D 3/126 222/465.1 |
| 5,460,391 A * | 10/1995 | Gantz | ............ | A47B 67/04 108/129 |
| 5,727,708 A * | 3/1998 | Erickson | ............ | B44D 3/126 206/514 |
| 6,164,212 A * | 12/2000 | Haggard | ............ | A47B 43/00 108/115 |
| 6,196,410 B1 * | 3/2001 | Hocking | ............ | B44D 3/126 206/209 |
| 6,695,325 B2 | 2/2004 | Carrillo | | |
| 7,516,704 B2 * | 4/2009 | Snider | ............ | B25H 1/04 108/25 |
| 7,568,667 B1 * | 8/2009 | Feik | ............ | B44D 3/14 248/128 |
| D734,586 S * | 7/2015 | Thibault | ............ | D34/14 |
| 2002/0056967 A1 * | 5/2002 | Carrillo | ............ | B62B 3/008 280/47.35 |
| 2007/0210547 A1 * | 9/2007 | Ellis | ............ | B62B 3/10 280/79.2 |
| 2009/0230644 A1 * | 9/2009 | Stanley | ............ | B62B 3/10 280/43 |
| 2009/0295110 A1 * | 12/2009 | Wilsher | ............ | B62B 3/00 280/47.35 |
| 2013/0277257 A1 * | 10/2013 | Aronoff | ............ | B44D 3/126 206/373 |

* cited by examiner

*Primary Examiner* — Brodie Follman
*Assistant Examiner* — Brian Cassidy
(74) *Attorney, Agent, or Firm* — James C. Nemmers; Shuttleworth & Ingersoll, PLC (57) ABSTRACT

A versatile and mobile, tool, paint, accessory and supply caddy for use by painters. The caddy provides multiple storage areas for paint cans, buckets, roller covers of different sizes as well as other painting materials and supplies. Buckets are removable when in use so as to make the job of painting more efficient with everything needed readily available and handy for use.

5 Claims, 9 Drawing Sheets

MULTIPURPOSE MOBILE CADDY

This application claims priority under 35 USC 119 to Provisional Patent Application Ser. No. 62/013,845 filed on Jun. 18, 2014 the contents of which are hereby incorporated by reference.

BACKGROUND OF THE INVENTION

This invention relates to the field of painting accessories. More particularly, this invention relates to a multipurpose mobile caddy for holding paint, painting supplies and equipment.

Many individuals chose to do their own painting rather than hire a professional painter. Most individuals, however, are not well organized or equipped to carry out the task of painting a room or rooms or the exterior of a house. To be efficient, a painter, amateur or professional, should have the paint brushes, rollers and masking tape as well as the paint itself well organized and within easy reach and readily available for use. There are known a number of tool caddies or tool holding devices as well as holders for carrying paint and painting supplies. An example of such a mobile caddy is shown in Carrillo U.S. Pat. No. 6,695,325. However, there is an ongoing need for improvements in carriers, especially mobile caddies, which will enable a painter to more efficiently perform the multiple tasks required in painting large areas.

SUMMARY OF THE INVENTION

It is an object of the present invention to overcome deficiencies of mobile carts by providing a mobile cart having multiple storage areas for paint, removable paint buckets and all needed equipment and paint supplies, such as paint brushes, rollers, roller covers and pans, all of which are placed in close operable relation to one another on a single cart so as to be easily transportable to a work site. An advantage of such a cart or caddy is that the painter may simultaneously have available all of the requisite supplies from one cart, thereby providing an efficient apparatus for completing a paint job.

Preferably and according to this invention, the caddy has a base mounted on casters, the base being formed into a single unit. The base has multiple compartments that provide storage areas for paint cans, buckets, roller covers of different sizes as well as other painting materials and supplies. Buckets are removable when in use and have handles for ease of carting. The buckets are adapted for use with paint rollers as well as brushes.

DETAILED DESCRIPTION OF THE PREFERRED EMBODIMENT

The present invention provides an extremely versatile, easy to use mobile carrier for tools, paint and accessories and supplies that can easily be moved around while painting. The paint caddy of the invention is designed to hold paint, buckets for paint that can be applied by rollers or brushes, as well as the tools, and other necessary materials. The caddy has a rectangular base 10 with a front end 12, a rear end 14 and two sides 16 and 18. The base is preferably formed into a single unit from plastic or any other suitable material and has four casters 11 attached to the base 10 so that the caddy can be easily moved from place to place. If desired, a tow handle (not shown) could be attached to the front end 12 to facilitate moving the caddy.

Figure 1:
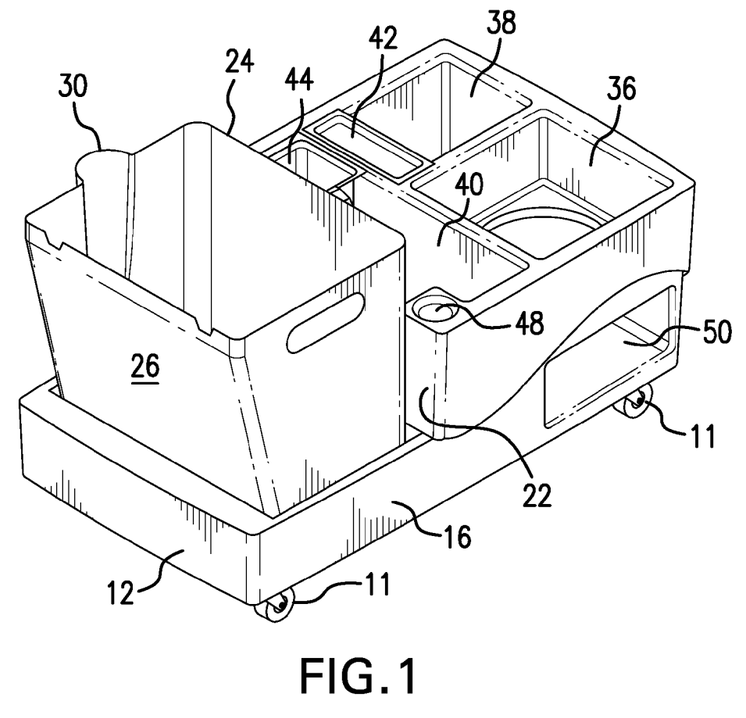
FIG. 1 is a perspective view showing the caddy of the invention as viewed generally from the front and from above.
Figure 2:
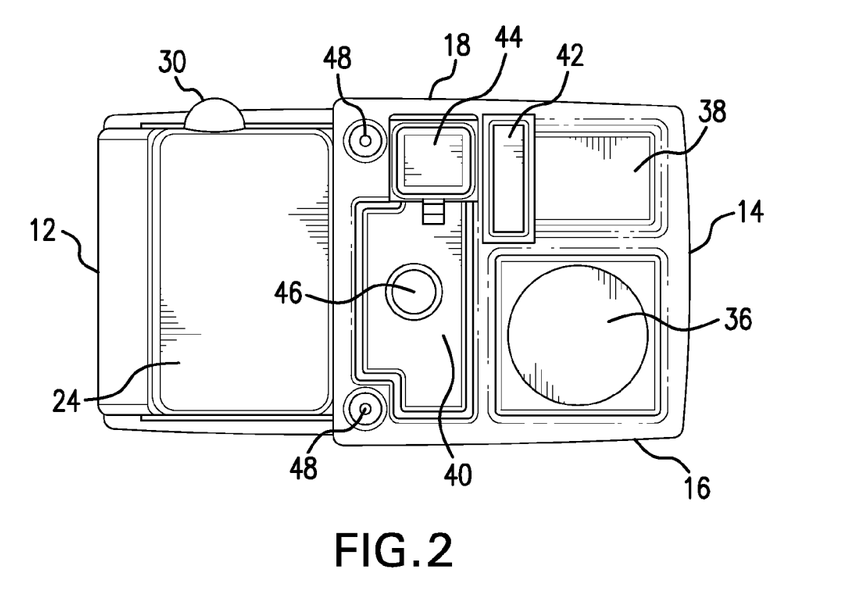
FIG. 2 shows a top or plan view of the caddy of FIG. 1.
Figure 3:
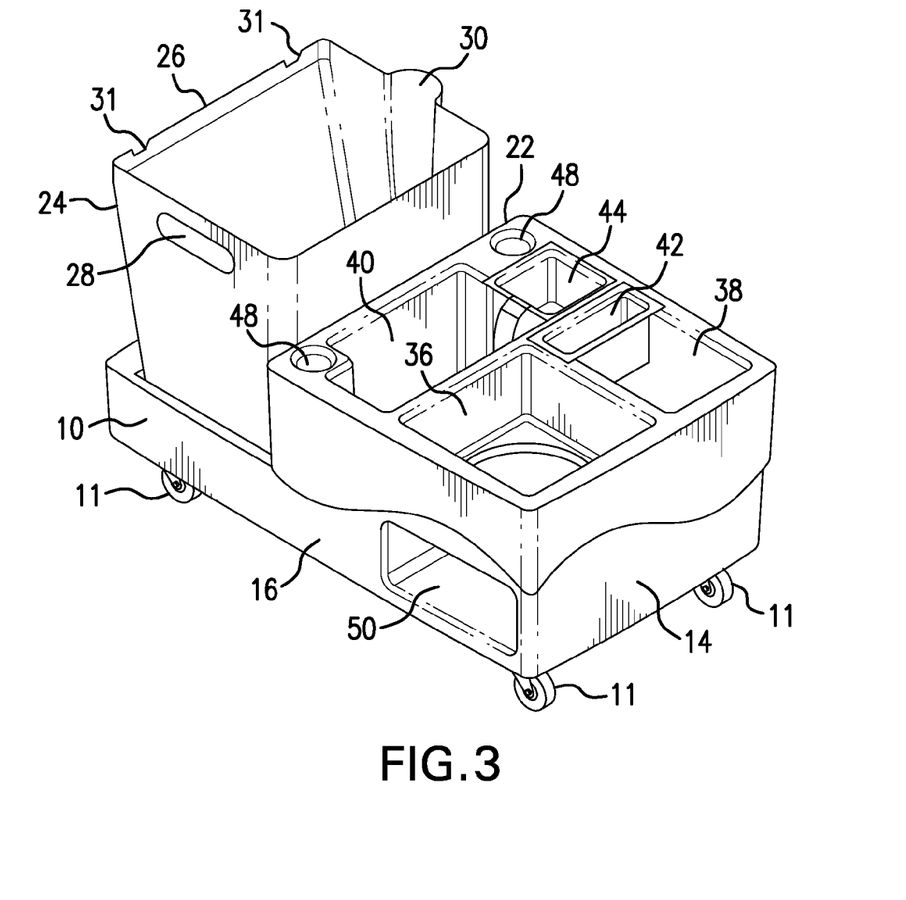
FIG. 3 is a perspective view showing the caddy viewed generally from the rear and from above.
Figure 4:
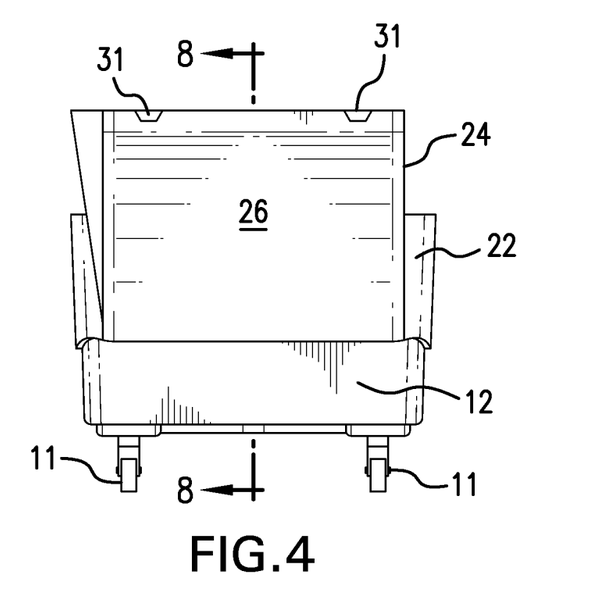
FIG. 4 shows a front elevation view of the caddy.
Figure 5:
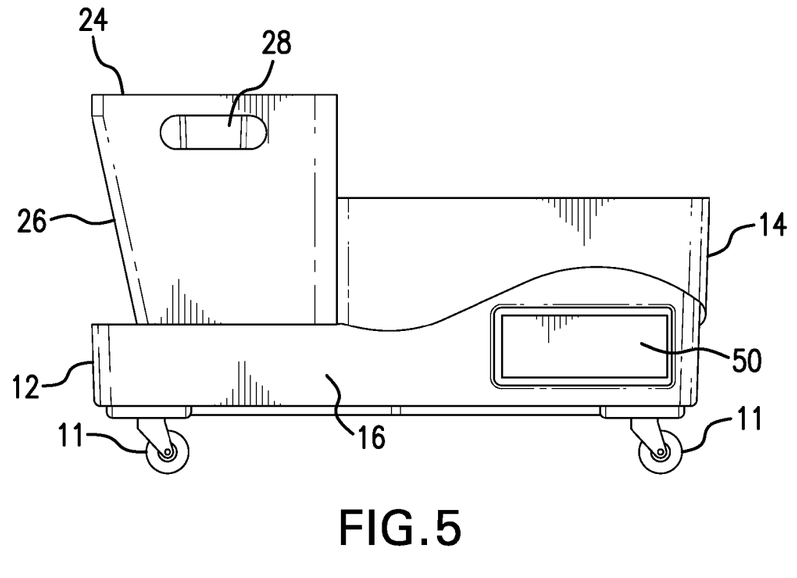
FIG. 5 shows a side elevation view of the caddy.
Figure 6:
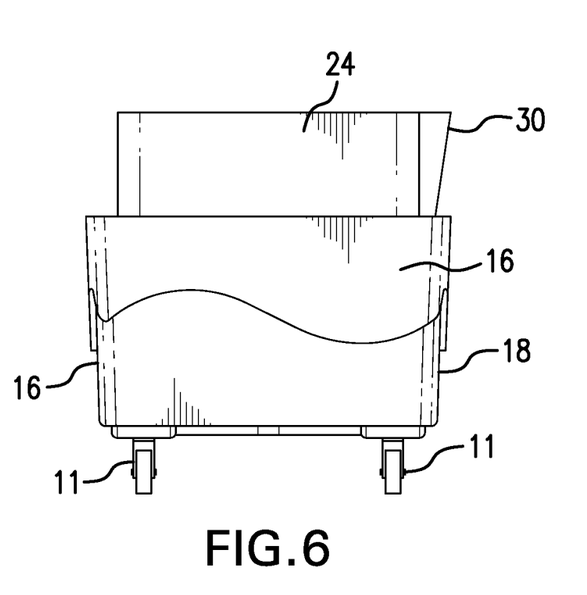
FIG. 6 shows a rear elevation view of the caddy.
Figure 7:
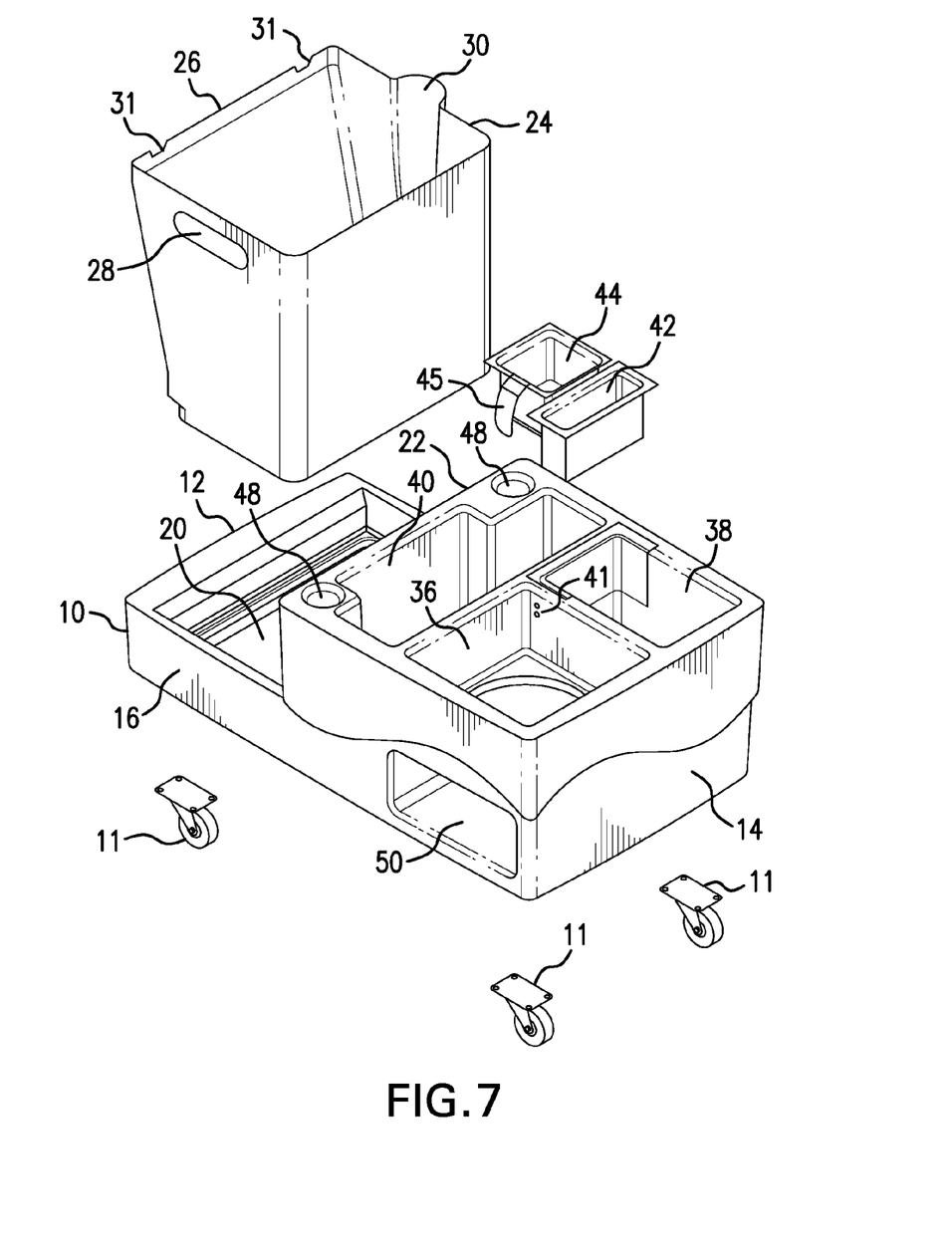
FIG. 7 is an exploded, perspective view of the caddy of FIG. 3.
Figure 9:
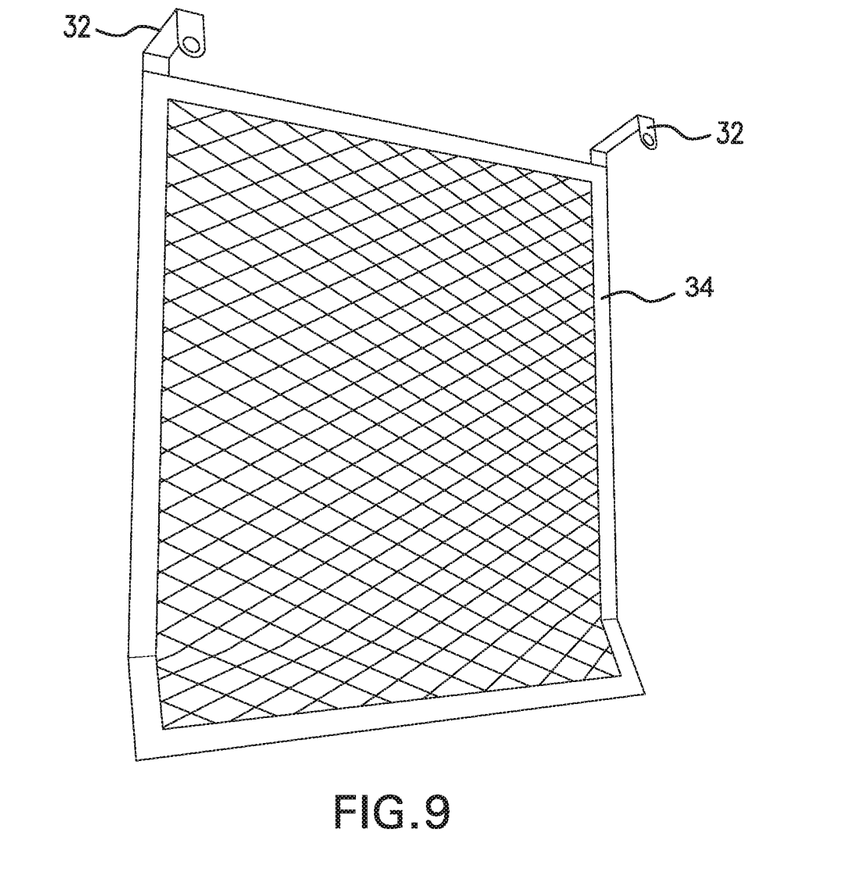
FIG. 9 is a perspective view of the screen used in the caddy.

Formed in the base 10 near the front end 12 is a compartment 20 (see FIG. 7) having a rear upwardly extending wall 22. Received in the compartment 20 is a removable paint bucket 24 sized to hold a large amount of paint. The bucket 24 has a slanted front wall 26 that extends upwardly and outwardly for a purpose described hereinafter. One side of the bucket 24 has an elongated slot 28 that provides a handle for lifting the bucket 24 and removing it from the caddy. On the side opposite the elongated slot 28 is formed a pour spout 30. Formed along the top edge of the slanted front wall 26 of the bucket 24 is a pair of spaced apart notches that receive hooks 32 that hold in place along the slanted front wall 26 a roller screen 34 (FIG. 9). The bottom of the screen 34 will extend into paint contained in the bucket 24 so that a standard paint roller (not shown) of varying size can be dipped into the paint and rolled along the screen to remove excess paint from the roller. When the caddy of the invention if being used, the amount of paint in the bucket 24 does not have to be too deep as long as the depth is sufficient to allow the paint to adhere to the paint roller when it is dipped into the paint and before the paint is spread on the roller by rolling it on the screen 34.

As shown in the drawings, the rear end 14 of the base 10 is approximately the same height as the rear wall 22 thereby providing for multiple compartments 36, 38 and 40. Compartment 36 preferably is sized to receive and securely hold a gallon sized can of paint. A hook (not shown) may be received in the openings 41 formed on one wall of compartment 36 (see FIG. 7). The hook is used to store a standard paint can opener (not shown) or the opener can be placed in the compartment without a hook. Compartment 38 is adapted to receive and hold a removable basket 42 sized to store a plurality of standard, small paint roller covers (not shown) or other small items that can be carried closer to the work site. The remaining space of compartment 38 is open so that miscellaneous paint supplies, such as rags, paper towels, etc. can be stored.

One side of compartment 40 is formed to provide a space adapted to receive and hold a removable small paint bucket 44 that has a handle 45 so that the bucket can be removed from the caddy and carried around by the painter. Before filling, bucket 44 can be used to store small trim brushes for trimming around the edges of walls, etc. In the larger portion of compartment 40 there is formed in its bottom surface a raised round projection 46 to receive a roll of masking tape, for example. The remaining open area above the projection 46 can be used to store rollers, etc. In addition, the rear wall 22 provides in the front corners of the compartment 40 round hollow spaces 48 in which can be stored extensions for roller handles.

Figure 8:
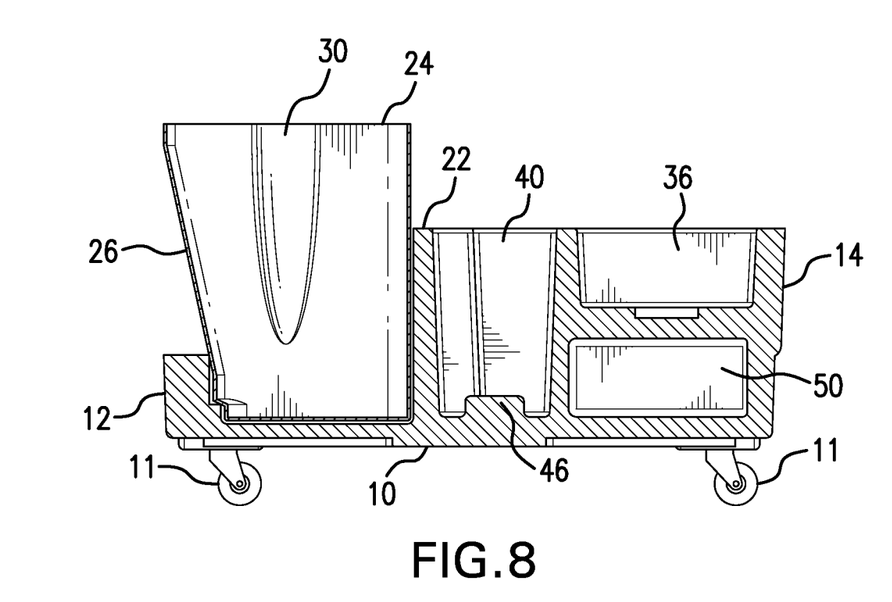
FIG. 8 is a sectional view of the caddy taken on the line 8-8 of FIG. 4.

As best illustrated in FIG. 8, the area in the base 10 beneath the compartments 36 and 38 is hollow and open on side 16 to provide a compartment 50 for the storage of large roller covers, for example. Additionally, if desired, a cover (not shown) can be used to cover and protect the entire caddy when not in use.

It will be appreciated that although the present invention has been described in detail with regard to the preferred embodiment of the invention, it should be apparent to those skilled in the art that various adaptations and modifications of the present invention may be accomplished without departing from the spirit and the scope of the invention. For example, the various compartments and storage areas can be rearranged from those shown in the drawings. Also, the number, size, shape and placement of the compartments holders, etc. can be varied from those shown in the illustrated embodiment of the invention. The structural features can also take a wide variety of shapes, and could include supports or webs added for additional strength. Accordingly, it is to be understood that the detailed description and the accompanying drawings are for purposes of showing the preferred and best embodiment of the invention and are not intended to limit the breadth of the present invention, but rather all modifications as would be obvious to one skilled in the art are intended to be included within the scope of the invention.

The invention claimed is:

1. A mobile caddy for holding paint, paint rollers, tools, accessories and the like within easy reach of a painter, said caddy comprising:
    a base having a front wall forming a front end, a rear wall forming a rear end, side walls and interior walls that form open areas providing more than one compartment;
    a first interior wall extending across the side walls and together with the rear wall these two walls extend upwardly to a height greater than the height of the front wall;
    a first compartment formed by the front wall and first interior wall;
    a first removable paint bucket seated in the first compartment and being held between the front wall and the first interior wall;
    the first paint bucket having an open top with upwardly extending walls that form a rectangular open top, the bucket being capable of holding an amount of paint greater than a gallon sized paint can;
    one of the upwardly extending walls of the first paint bucket extending outwardly to form a slanted wall which has a pair of spaced apart notches;
    a removable screen combined with the slanted wall to remove excess paint from a paint roller, the screen having hooks adapted to engage the notches in the slanted wall of the first paint bucket;
    a second compartment formed by the first interior wall and a second interior wall of the same height to provide a second compartment smaller than the first compartment;
    a second removable paint bucket combined with the second compartment and having an open top with upwardly extending walls, the second bucket being smaller than the first paint bucket and capable of holding an amount of paint less than the amount that can be held by the first paint bucket;
    a removable storage basket positioned in the second compartment together with the second paint bucket leaving an open area in the second compartment, the open area providing for additional storage of paint accessories;
    a third compartment between the second interior wall and the rear wall and of a size adapted to hold a gallon sized can of paint;
    a fourth compartment between the second interior wall and the rear wall to provide for additional storage of paint supplies;
    a horizontally extended wall extending from side to side of the base and beneath one or more of the second, third and fourth compartments to create a fifth compartment suitable for storage of additional painting accessories; and
    casters mounted on the base to facilitate movement of the caddy.

2. The mobile caddy of claim 1 in which the first removable paint bucket has a handle formed in one wall of the bucket to facilitate removing the paint bucket.

3. The mobile caddy of claim 2 in which the first removable paint bucket has a pouring spout formed in the wall opposite the wall containing the handle.

4. The mobile caddy of claim 3 in which the second removable paint bucket has a handle.

5. The mobile caddy of claim 1 in which a wall of the third compartment provides for the storage of a paint can opener.

* * * * *